(12) United States Patent
Simske et al.

(10) Patent No.: US 9,020,831 B2
(45) Date of Patent: Apr. 28, 2015

(54) INFORMATION TRACKING SYSTEM AND METHOD

(75) Inventors: Steven J. Simske, Fort Collins, CO (US); Chris Coughlan, Galway (IE); Mark Jacobsen, Galway (IE); Mick Keyes, Dublin (IE); Gary Moloney, Galway (IE)

(73) Assignee: Hewlett-Packard Development Company, L.P., Houston, TX (US)

( * ) Notice: Subject to any disclaimer, the term of this patent is extended or adjusted under 35 U.S.C. 154(b) by 82 days.

(21) Appl. No.: 13/635,407

(22) PCT Filed: Apr. 29, 2010

(86) PCT No.: PCT/US2010/033011
§ 371 (c)(1),
(2), (4) Date: Sep. 15, 2012

(87) PCT Pub. No.: WO2011/136780
PCT Pub. Date: Nov. 3, 2011

(65) Prior Publication Data
US 2013/0041899 A1     Feb. 14, 2013

(51) Int. Cl.
G06Q 10/00 (2012.01)
G06F 17/30 (2006.01)
H04L 29/08 (2006.01)

(52) U.S. Cl.
CPC .......... *G06F 17/30893* (2013.01); *H04L 67/36* (2013.01); *H04L 67/22* (2013.01); *H04L 67/12* (2013.01)

(58) Field of Classification Search
CPC ... G06F 17/243; G06F 17/3089; G06Q 10/06; G06Q 10/06316; G06Q 10/0633; Y10S 707/99943; H04L 67/22
See application file for complete search history.

(56) References Cited

U.S. PATENT DOCUMENTS

| 7,484,662 B2 | 2/2009 | Schmidtberg et al. |
| 7,487,037 B2 | 2/2009 | Schmidtberg et al. |

(Continued)

FOREIGN PATENT DOCUMENTS

| CA | 2713948 A1 * | 8/2009 |
| WO | WO00/67176 | 11/2000 |
| WO | WO 0178425 A1 * | 10/2001 |

OTHER PUBLICATIONS

A P2P Approach to Resource Discovery in On-Line Monitoring of Grid Workflows, Labno et al, Euro-Par 2008, LNCS 5168, pp. 37-46, 2008.*

(Continued)

*Primary Examiner* — Augustine K Obisesan
(74) *Attorney, Agent, or Firm* — Hewlett-Packard Patent Dept

(57) ABSTRACT

A system includes a plurality of sources that subscribe to, and another source that is unaffiliated with, a workflow management system. The system further includes a registry database that has pre-existing fields that are configured to store data received from one or more of the sources or from the other source, and de novo fields that are configured to be generated as a result of a data collection event and are configured to store data received from one or more of the sources or from the other source. An engine is configured to actively collect data from the sources and from the other source. The system further includes a dynamically updatable user interface that is operatively connected to the registry database. The dynamically updatable user interface is configurable or re-configurable for a particular one of the plurality of sources in response to the data collection event.

19 Claims, 5 Drawing Sheets

(56) References Cited

U.S. PATENT DOCUMENTS

| | | | |
|---|---|---|---|
| 8,407,597 B1* | 3/2013 | Tom | 715/736 |
| 8,560,941 B2* | 10/2013 | Burns | 715/237 |
| 2002/0062367 A1* | 5/2002 | Debber et al. | 709/224 |
| 2003/0074302 A1* | 4/2003 | Cope | 705/37 |
| 2003/0079180 A1* | 4/2003 | Cope | 715/511 |
| 2003/0182212 A1 | 9/2003 | Moscone et al. | |
| 2003/0212580 A1 | 11/2003 | Shen | |
| 2003/0227392 A1 | 12/2003 | Ebert et al. | |
| 2004/0006592 A1* | 1/2004 | Chang et al. | 709/203 |
| 2004/0078373 A1* | 4/2004 | Ghoneimy et al. | 707/10 |
| 2004/0249667 A1* | 12/2004 | Oon | 705/2 |
| 2005/0052284 A1 | 3/2005 | Schmidtberg et al. | |
| 2005/0055268 A1 | 3/2005 | Schmidtberg et al. | |
| 2005/0093881 A1* | 5/2005 | Okita et al. | 345/589 |
| 2006/0047611 A1* | 3/2006 | Selifonov et al. | 706/13 |
| 2006/0085452 A1* | 4/2006 | Cope | 707/100 |
| 2006/0282302 A1* | 12/2006 | Hussain | 705/9 |
| 2007/0005266 A1 | 1/2007 | Blevins et al. | |
| 2007/0005630 A1* | 1/2007 | Selca et al. | 707/102 |
| 2007/0078787 A1* | 4/2007 | Mersky et al. | 705/75 |
| 2007/0143398 A1 | 6/2007 | Graham | |
| 2007/0226241 A1* | 9/2007 | Ng et al. | 707/102 |
| 2007/0299828 A1 | 12/2007 | Lewis et al. | |
| 2008/0005287 A1 | 1/2008 | Harvey et al. | |
| 2008/0126987 A1* | 5/2008 | Meschian et al. | 715/825 |
| 2008/0189628 A1* | 8/2008 | Liesche et al. | 715/762 |
| 2009/0012806 A1 | 1/2009 | Ricordi et al. | |
| 2009/0044185 A1* | 2/2009 | Krivopaltsev | 717/173 |
| 2009/0150184 A1* | 6/2009 | Spahn | 705/3 |
| 2009/0193057 A1* | 7/2009 | Maes | 707/200 |
| 2009/0194587 A1 | 8/2009 | DeVet et al. | |
| 2009/0198651 A1 | 8/2009 | Shiffer et al. | |
| 2009/0204897 A1* | 8/2009 | Sogge et al. | 715/700 |
| 2009/0234881 A1* | 9/2009 | McCormack et al. | 707/103 R |
| 2010/0250497 A1* | 9/2010 | Redlich et al. | 707/661 |
| 2010/0251092 A1* | 9/2010 | Sun | 715/222 |
| 2010/0262902 A1* | 10/2010 | Burns | 715/234 |
| 2010/0299763 A1* | 11/2010 | Marcus et al. | 726/30 |
| 2011/0119309 A1* | 5/2011 | Aronson et al. | 707/791 |
| 2011/0238458 A1* | 9/2011 | Purcell et al. | 705/7.27 |
| 2011/0283177 A1* | 11/2011 | Gates et al. | 715/224 |

OTHER PUBLICATIONS

Jane Hunter et al, "Provenance Explorer—a Graphical Interface for Construction Scientific Publication . . . ", V.7, Jul. 13, 2007, pp. 99-107.

Manish Kumar et al, "Provenance Browser: Displaying and Querying Scientific Workflow . . . ".

* cited by examiner

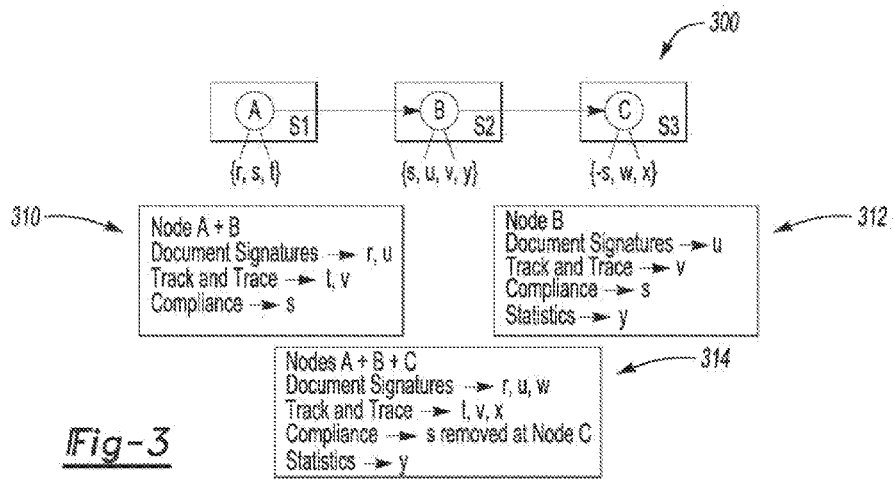
_Fig-3_
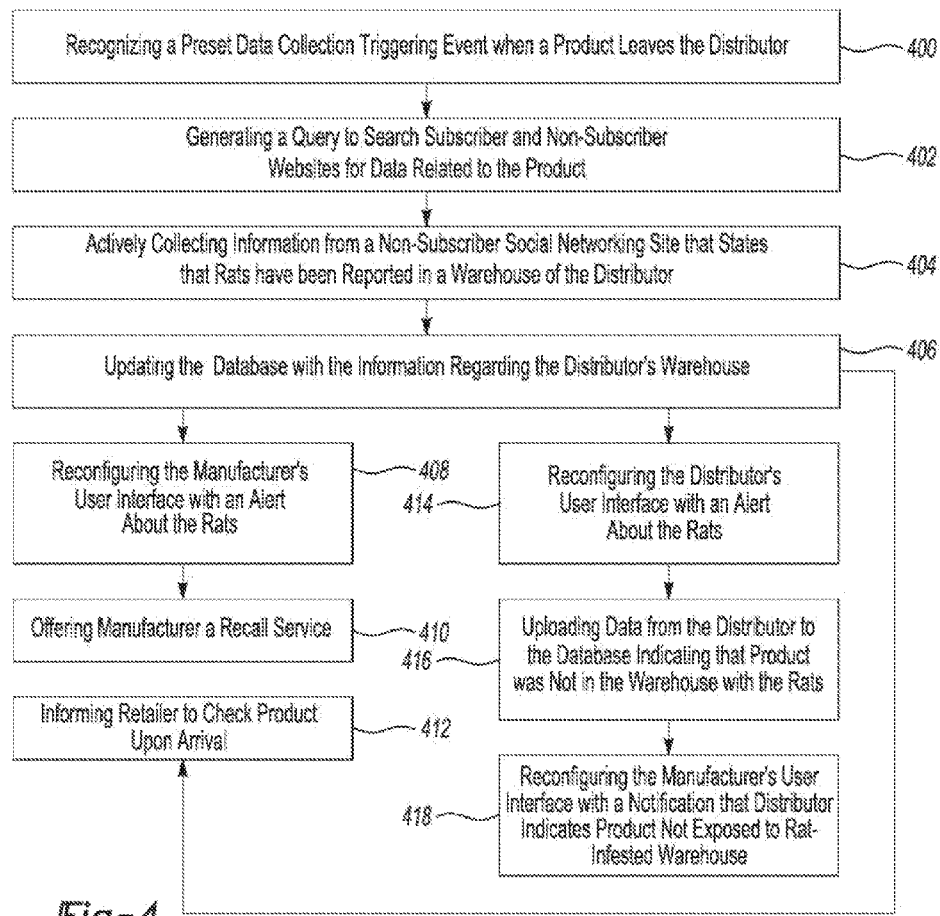
_Fig-4_

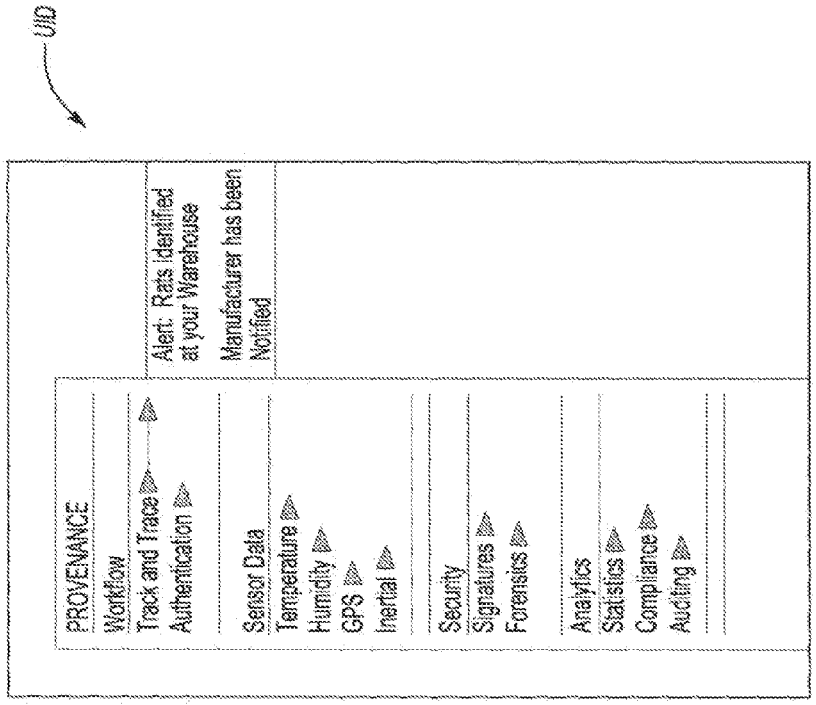
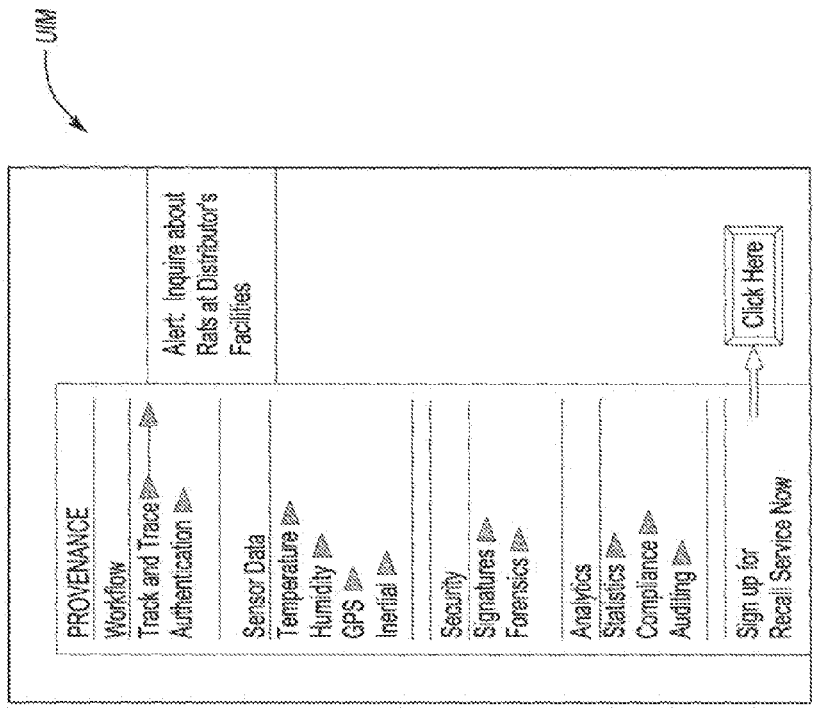
Fig-5B
Fig-5A

INFORMATION TRACKING SYSTEM AND METHOD

BACKGROUND

The present disclosure relates generally to an information tracking system and method.

Companies and individuals often utilize systems in order to electronically manage products and/or documents. Some systems are closed to the company/individual (i.e., data can be selectively added to and retrieved from the system by the employees of the company and/or by the individual), and other systems are open to a variety of companies/individuals (i.e., data can be selectively added to and retrieved from the system by the employees of the various companies and/or by the various individuals) who subscribe to such a system. When the system is open to a variety of users, many of the users may be involved in a single product and/or document workflow (e.g., a product track and trace workflow). In these instances, the products and/or documents themselves may be tied to a specific lifecycle (e.g., validation at point A, handoff to point B, validation at point B, etc.), or to a set of prescribed sequential activities that are to be performed. The provenance record (i.e., document pedigree) for such a workflow depends, at least in part, upon the specific lifecycle and the processing/handling of the document in accordance with this lifecycle.

SUMMARY

An information tracking system includes a plurality of sources that subscribe to, and another source that is unaffiliated with, a workflow management system. The information tracking system further includes a registry database that has pre-existing fields that are to store data received from one or more of the sources or from the other source, and de novo fields that are to be generated as a result of a data collection event and are to store data received from one or more of the sources or from the other source. An engine is to actively collect data from the sources and from the other source. The system further includes a dynamically updatable user interface that is operatively connected to the registry database. The dynamically updatable user interface is configurable or re-configurable for a particular one of the plurality of sources in response to the data collection event.

BRIEF DESCRIPTION OF THE DRAWINGS

Features and advantages of embodiments of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 3 is a schematic diagram illustrating visible feedback for different nodes within the system as a workflow progresses;

FIG. 4 is a flow diagram illustrating a specific embodiment of the method for performing dynamic configuration or re-configuration of one or more user interfaces in the system; and FIGS. 5A through 5D are schematic diagrams illustrating examples of screen shots of different user interfaces at different points of the method shown in FIG. 4.

DETAILED DESCRIPTION

Figure 1:
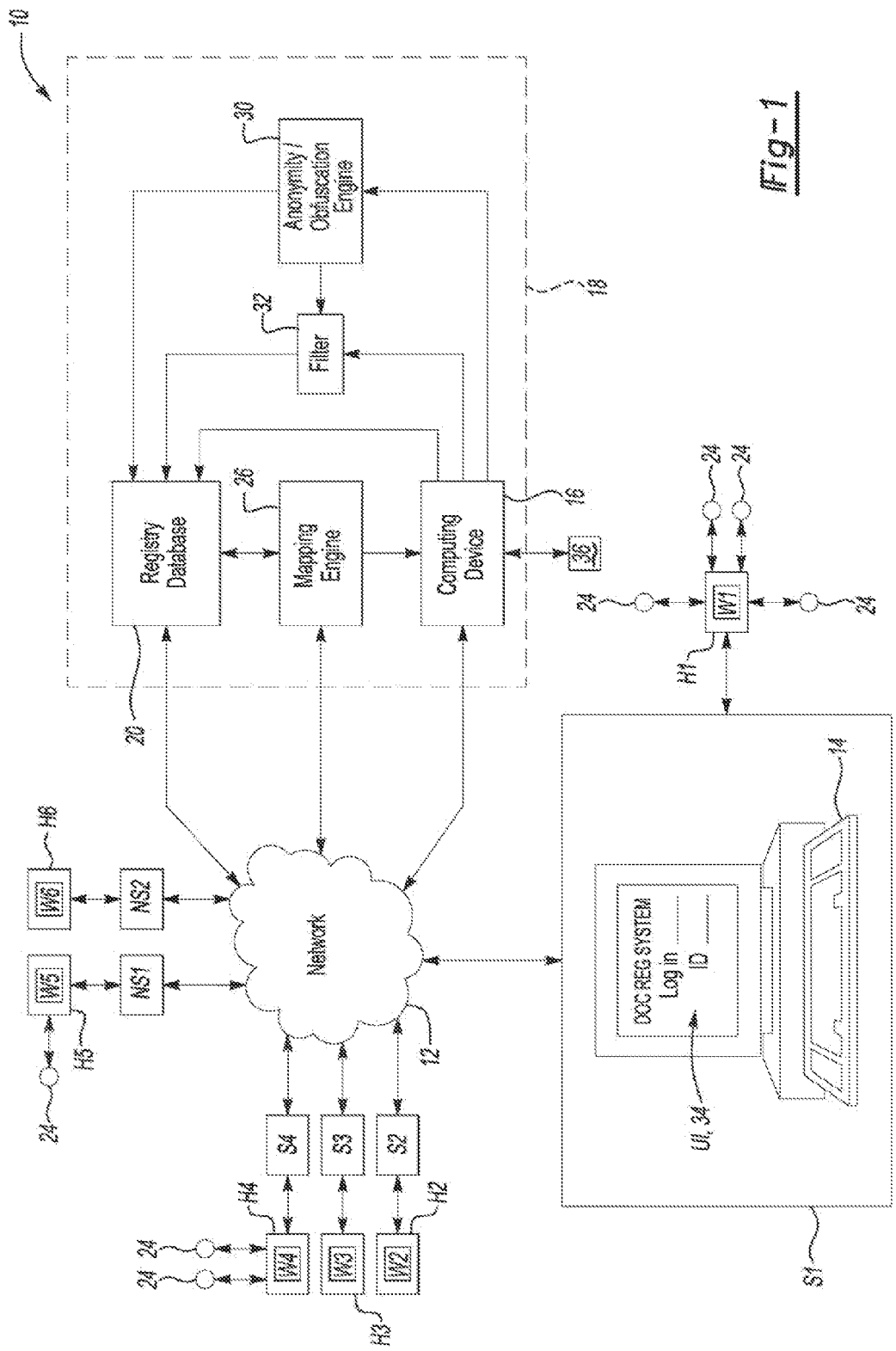
FIG. 1 is a schematic diagram of an embodiment of an information tracking system.
Figure 2:
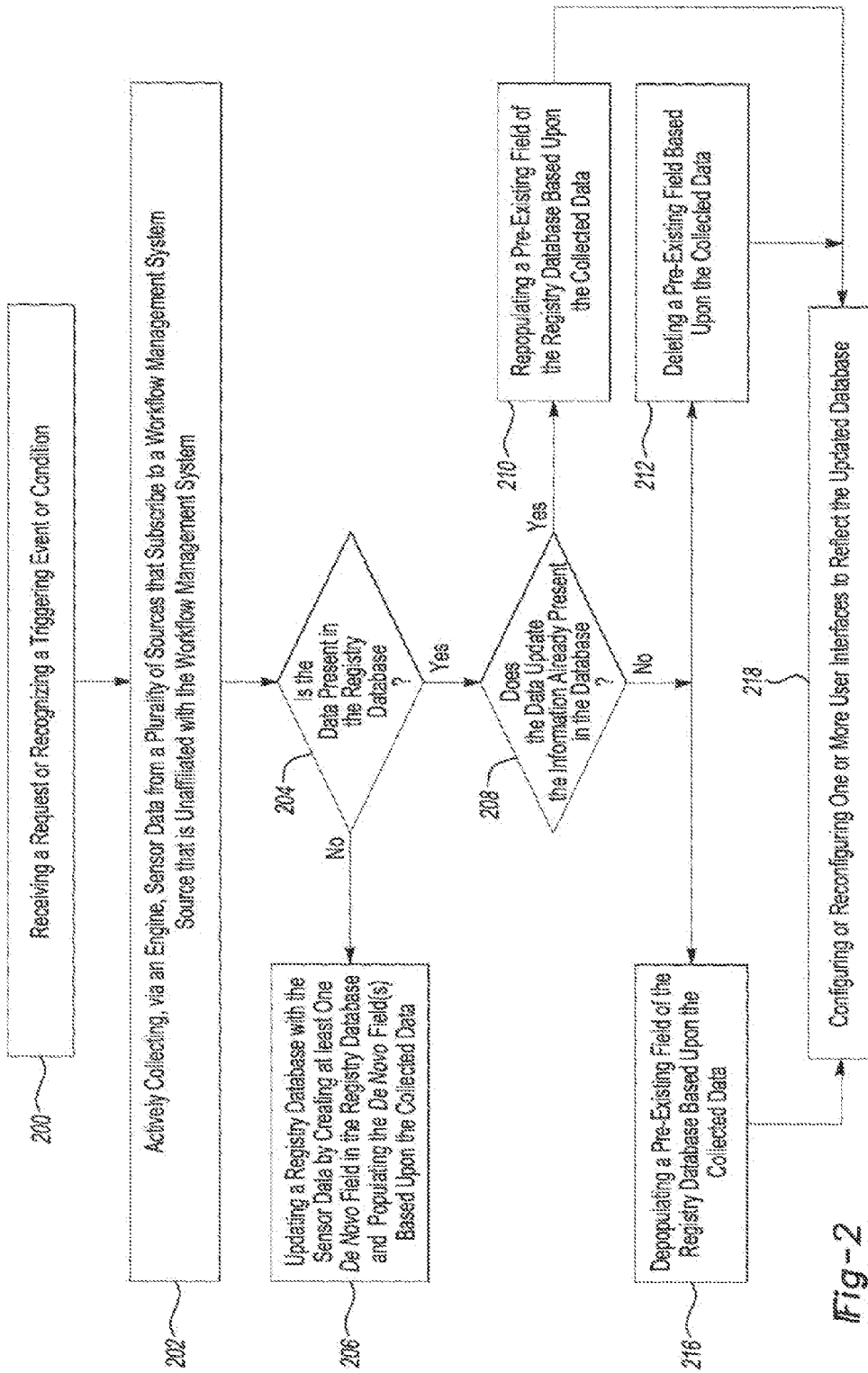
FIG. 2 is a flow diagram illustrating an embodiment of a method for performing dynamic configuration or re-configuration of one or more user interfaces in the system.

Embodiments of the information tracking system disclosed herein include a platform for combining data from subscribers with data from non-subscribers, and a ubiquitous on-ramp to this aggregated data. Components of the system disclosed herein receive this data, and automatically change and update the visible (e.g., graphical) feedback for a particular user based upon this data. As such, the system provides dynamically alterable user interfaces for each subscriber of the system based upon data that is newly added, or upon new data that is combined with previously stored data. This enables workflows in the system to be updated and/or altered upstream of, downstream of, or at a data collection point. Furthermore, the data that is collected and generated enables a data-rich provenance record (i.e., history) to be created that extends beyond traditional track and trace or other existing provenance records. This system affords real-time, multi-media, multi-user, secure access to a readily-scaled data rich provenance for items (e.g., documents, products, etc.) of value. The embodiments of the information tracking system disclosed herein may be used to manage product and/or document based compliance, auditing, and workflow progress and completion, as well as to perform other enterprise or consumer/brand relevant tasks (e.g., brand protection/anti-counterfeiting efforts and customer/brand interaction).

As used herein, the phrase "workflow" refers to an automated process during which products, documents, information, or tasks are passed from one participant to another for action and/or informational purposes, according to a set of procedural rules. Workflows include imaging workflows (e.g., quality assurance, authentication, forensics, etc.), supply chain workflows (e.g., track and trace, inspection, shipping/receiving, recall, etc.), environmental or sensor data monitoring workflows, or other suitable workflows (e.g., statistics [e.g., inventory, average time at a node, etc.], compliance, auditing, etc.). In other words, a workflow is any defined set of tasks to complete associated with a document and/or product. A workflow provenance consists of a template outlining the history of the products/documents/information/tasks, along with any actions taken and/or information received pertaining to the workflow. The provenance record maps, and in some instances links, the various elements of the workflow together In one example, the workflow provenance is a full, auditable (e.g., digitally signed, securely stored, etc.) log of all of the tasks completed in the workflow along with associated information (e.g., who performed the tasks, digital signatures therewith, etc.). Also as used herein, a "node" refers to a then-current state in the workflow. In one embodiment, if a document moves from a creator to an editor to a subscriber, the respective nodes are, for example, creation, editing, and receive copy. At any instance, the node corresponds with a current version of a document (e.g., a composite document or including several items) or current status/location of a product. It is to be understood that nodes can also be in parallel, for example, when multiple recipients need to acknowledge receipt.

Referring now to FIG. 1, a schematic diagram of an embodiment of the information tracking system 10 is depicted. Each system 10 component will be described briefly in reference to FIG. 1, and the functions of the components will be described in detail in reference to FIGS. 2, 3, 4 and 5A through 5D.

The system 10 includes a cloud computing network 12, which is a virtualized bank of computers (e.g., processors and/or servers) that enables Internet-based computing. Via the cloud network 12, shared resources, software and information are provided to various computing devices 14, 16 (whether stationary (e.g., desktop computers) or mobile (e.g., laptop computers, netbooks, cellular phones, personal digital assistants (PDAs), etc.)) in an on-demand basis. The cloud computing network 12 allows the information tracking system provider (not shown) to deliver the workflow management system 18 and its various services to subscribers S1, S2, S3, S4 online via another web service or software, such as a web browser. Software and data associated with the cloud computing network 12 are stored on servers (not shown).

As used herein, subscribers S1, S2, S3, S4 include those companies and/or individuals who sign up for one or more services offered by the owner/operator of a workflow management system 18. Some subscribers S1, S2, S3, S4 are linked to one another because they alter the node of a workflow in which the respective subscribers S1, S2, S3, S4 participate. It is to be understood that the subscribers S1, S2, S3, S4 may or may not be aware of the other participants in a workflow, When the subscriber S1, S2, S3, S4 is a company, one or more individuals associated with the company may be provided with system 18 identification/authentication access criteria. Furthermore, the various individuals of a subscriber company given access to the system 18 may have different information access levels. These levels may be set (e.g., by a manager or other authority figure) during an initial sign-up period, and are saved, for example, in a profile associated with that subscriber in the database 20. These levels may also be set based upon the workflow in which the subscriber S1, S2, S3, S4 takes part (e.g., a participant in a clinical trial may not have access to records of other participants in the clinical trial). When a user not having access reviews a workflow or provenance record, any information that he/she is not privy to is grayed or blacked out. It is to be understood that users may be added and/or deleted, and that access levels of existing users may be changed by an individual at the subscriber having authority to make these changes. Access levels may also depend, at least in part, upon the security policies, compliance/auditing rules (Sarbanes-Oxley, HIPAA, etc.), and other business rules of the subscriber S1, S2, S3, S4.

One or more subscribers S1, S2, S3, S4 (also referred to herein as sources) may be affiliated with a respective data network, each of which includes a web-accessible information storage space W1, W2, W3, W4, and a host server H1, H2, H3, H4 of the web-accessible information storage space W1, W2, W3, W4. Various types of data may be transmitted in the form of packetized data to the respective host server H1, H2, H3, H4, on-demand in response to a request for the data (e.g., from a pollable sensor), or during a scheduled upload event (e.g., from a self-reporting sensor), or both on-demand and during scheduled upload events, or as a result of random upload events (e.g., website update, blog chatter, etc.). Transmitted data may also be encrypted, digitally signed, etc. as security demands require. The host server H1, H2, H3, H4 includes a receiver (not shown) that receives the raw data and processor(s) or other computing device(s) (also not shown) that post/posts the raw data, or data derived from the raw data, to the web-accessible information storage space W1, W2, W3, W4. The web-accessible information storage space W1, W2, W3, W4 may be any multi-user, potentially multi-access level, web-accessible registry, web-accessible database, web-accessible posting location, or other web-accessible salient host of information. In some instances, the web-accessible information storage space W1, W2, W3, W4 is associated with a website or a datastore that is web-accessible.

In some instances, these data networks include one or more sensors 24. The sensors 24 may be selected from surveillance systems, radar sensors, radiofrequency sensors, imaging sensors, global positioning systems, weather sensors, temperature sensors, devices configured to report predetermined information about an event, devices configured to report predetermined information about a signal type, and combinations thereof. Specific examples of pollable sensors (i.e., those that can be interrogated) include radar/THz sensors, RFID, barcodes, overt security markings, etc. Specific examples of self reporting sensors include printed battery and smart tags, blinking devices, electroluminescence devices, etc. The sensors 24 are each positioned to collect a particular type of raw data (e.g., temperature data, seismic data, location data, etc.), and are configured to transmit the collected raw data to the host server H1, H2, H3, H4 in operative communication therewith. The host server H1, H2, H3, H4 then posts the raw data or data derived therefrom to the web-accessible information storage space W1, W2, W3, W4.

Also as used herein, non-subscribers NS1, NS2 include those companies and/or individuals who have not signed up for one or more services offered by the owner/operator of the workflow management system 18. One or more of the non-subscribers NS1, NS2 may be affiliated with a respective data network, each of which includes a web-accessible information storage space W5, W6 a host server H5, H6 of the web-accessible information storage space W5, W6, and, in some instances, one or more sensors 24. The components of the non-subscribers NS1, NS2 sensor networks function similarly to the components of the subscriber S1, S2, S3, S4 data networks. It is to be understood that data networks affiliated with non-subscribers NS1, NS2 are considered to be unaffiliated with the information tracking system because they are associated with non-subscribers NS1, NS2 of the workflow management system 18. It is to be further understood that non-subscribers NS1, NS2 may become subscribers S1, S2, S3, S4, and vice versa.

The system 10 may also include one or more dedicated data networks 36, which directly transmits raw data to the computing device 16 of the system 18. This particular data network is dedicated to the workflow management system 18 and collects sensor or other data specifically for the system 18. One non-limiting example of a dedicated data network 36 is a web feed (i.e., a data format that provides users with frequently updated content). In a web feed, one or more content provider(s) publish(es) a feed link, to which the system 18 subscribes. The system 18 may include an aggregator (not shown) which asks (e.g., at predefined intervals or in response to a data collection triggering event, discussed further hereinbelow) all the servers in its feed list if they have new content. When new content is available, the aggregator will download the content and transmit it to computing device 16 for further processing.

The subscribers S1, S2, S3, S4 data networks, the non-subscribers NS1, NS2 data networks, and/or the dedicated data networks 26 may be satellite-based, mobile network-based, dedicated links, wired links, or combinations thereof.

Subscribers S1, S2, S3, S4 gain access to the workflow management system 18 via a web service (e.g., a website, webpage, etc.) that provides and displays an access point 34 into the system 18. The access point 34 may be accessed via any computing device 14 configured to link to the cloud computing network 12. While a single computing device 14 is illustrated in FIG. 1, it is to be understood that a single subscriber S1, S2, S3, S4 may have any number of computing devices 14. The access point 34 may include data entry fields that allow a user to enter personal (e.g., a login ID) and authenticating information (e.g., a password, a PIN, etc.). In other instances, the computing device 14 used to access the access point 34 may include other hardware which, for example, can receive and read a smart card for identification/authentication purposes, or can utilize biometrics for identification/authentication purposes. In the latter example, the device 14 includes or is operatively connected to equipment that takes repeated measurements of physiological and behavioral characteristics to verify the user's identity. Any identifying information entered via the access point 34 is transmitted via the cloud computing network 12 and is received by a back-end (networked) computing device 16 (e.g., a virtualized and/or redundant processor), which analyzes the information and either allows or denies the requesting user access to the system 18.

When the information received at the access point 34 is verified by the back-end computing device 16, the user is able to virtually enter the workflow management system 18. The access granted will depend upon the previously mentioned security levels associated with the user requesting access, and in some instances, will also depend upon security setting(s) that are set directly from the nature of the access point 34 (e.g., requiring an https connection). Upon logging in, the user may access one or more workflows that he/she is privy to, may access his/her or a company profile (if privy to such information), and/or may enter a request/search entry related to any document, product, and/or workflow in the system 18. The request/search entry is entered from the computing device 14 using a set of privileged commands (e.g., in the case of a menu-driven access control system), a free text search (e.g., in the case of a search driven system), or other user interface front end that is available once logged on to the system 18.

Some requests are atomic requests, or relate to a single workflow and/or a single aspect of that workflow. Other requests are molecular requests, which include two or more atomic requests (e.g., relate to multiple aspects of a single workflow). Still other requests are composite requests, which include atomic and/or molecular requests across multiple workflows. As non-limiting examples, the initial requests may relate to finding incomplete tasks in a workflow, out of sequence tasks in a workflow, non-legitimate field entries, overdue tasks, reasons for workflow rejections, statuses (e.g., archival status, current status of one or more products (e.g., status of product shipment), or the like), or any other desirable document, product, and/or workflow related question.

When a request entry is used, the request entry is submitted to the workflow management system 18, which includes a registry database 20, a mapping engine 26, the computing device 16, an anonymity/obfuscation engine 30, and filter(s) 32. It is to be understood that the components of the system 18 may be implemented in a consolidated location, or portion(s) of the system 18 may be implemented at different locations. It is to be further understood that each of these components is either directly or indirectly in operative communication with the cloud computing network 12, and each includes respective software and/or programs that are configured to perform one or more operations of the workflow management system 18, including one or more steps of the embodiments of the methods disclosed herein (see, e.g., FIGS. 2 and 4). Furthermore, while a single one of some of the components is shown in FIG. 1, the system 18 may include multiple mapping engines 26, computing devices 16, anonymity/obfuscation engines 30, and filters 32.

The registry database 20 includes hardware for storing data associated with product and/or documents workflows, and also includes software for presenting the data in pre-existing fields (i.e., part of the original database or previously generated as a result of a previously performed data collection event) or de novo fields (i.e., newly generated as a result of a then-current data collection event), both of which will be discussed further hereinbelow. It is to be understood that when data in the registry database 20 is presented to a user of the system 18, the data may be presented to the user in a predetermined format, depending upon both the user's access level and the data that is received and/or generated.

Data input into the database 20 may be organized such that a hierarchy of data exists. Query semantics tags may be assigned to the subscribers S1, S2, S3, S4 and/or to one or more workflows after a sensor data search is performed. Specific field(s) of the workflow may be tagged/flagged, specific document(s) or product information within the workflow may be tagged/flagged, and/or specific workflow(s) may be tagged/flagged in order to create the desired hierarchy. The query semantics tags may vary from the trivial to the arcane. As one non-limiting example, the query semantics tags may relate to certain text, such that any document within a particular workflow or the entire workflow is flagged if it contains that text. As another non-limiting example, the query semantics tag may flag the 15 documents in the entire database 20 that are most similar in content to the document that is the subject of a query. The tags may be put in place by the user of the system 18 when logged in to his/her account. These tags/flags may be viewed by any other user that has access rights to the workflow(s) and/or data that are assigned the tags.

The mapping engine 26 includes hardware and software configured to perform multiple tasks. More particularly, the mapping engine 26 is the component of the workflow management system 18 that actively collects data from subscribers S1, S2, S3, S4 and non-subscribers NS1, NS2. Active data collection may take place in response to a request entry, to a triggering event, or to an externally imposed condition. A request entry is submitted to the system 18 from a user associated with one of the subscribers S1, 82, S3, S4. These request entries may relate to any document and/or product workflow that the user has access to in the system 18. A triggering event is the occurrence of some preset condition that, upon its occurrence, initiates the data collection. For example, the computing device 16 may be programmed to run a data collection event every twenty four hours, or to compare received data with preset acceptable threshold values and ranges. In the latter instances, when the device 16 recognizes that received data is above or below a predetermined threshold or outside of a preset range, the device 16 may be configured to prompt the mapping engine 26 to run a query related to the data. In some instances, the trigger may be pre-defined so that its occurrence triggers data input automatically, or it may be an event associated with any large change, including interruption or even oscillation, in ongoing data (i.e., dynamically defined as a trigger event without any semantic definition of the event a priori). Changes in ongoing data may be recognized using traditional text mining techniques. Still further, an externally imposed condition may be an audit or another event that prompts the system 18 to actively collect data and update the fields and/or records in the database 20.

In response to recognizing one of these scenarios or being prompted in response to one of these scenarios, the mapping engine 26 is configured to generate a query that will be used to search the data networks of the subscribers S1, S2, S3, S4 and the non-subscribers NS1, NS2. In one embodiment the query is based, at least in part, upon the access rules associated with the user who submitted the request/search entry.

Once a suitable query is generated, the mapping engine 26 utilizes the generated query to search for information related to the query. The search is conducted using various websites. More specifically, the engine 26 performs a web service search of the websites affiliated with the various data networks disclosed herein. The engine locates one or more of the salient, web-accessible information storage spaces W1, W2, W3, W4, W5, W6, and extracts data from the storage spaces W1, W2, W3, W4, W5, W6. Depending upon the query, the search may also be conducted in the database 20 and in the dedicated data network 36. The websites and associated web-accessible information storage spaces W1, W2, W3, W4, W5, W6 sources may be searched via search-based interrogation techniques, such as, for example, via search-engine interrogation, specific site scraping (i.e., extracting and filtering of salient information), or other like techniques. In one non-limiting example, the mapping engine 26 searches a non-subscriber web service to find salient databases, inputs information based upon the query, and digests the resulting information.

It is to be understood that data may also be input into the system 18 by subscribers S1, S2, S3, S4 manually or automatically (e.g., using a keyboard, scanner, etc.), or from sensors (not shown) that are located directly on a product. These sensors are pollable sensors or self-reporting sensors that transmit data to the computing device 16 when, for example, the sensors are read at a particular subscriber S1, S2, S3, S4 or when the sensors are programmed to submit the data. The sensor data that is logged in from these particular sensors is directly related to the product and/or the conditions to which the product has been exposed because these sensors travel with the product. Non-limiting examples of product-associated sensors include environmental sensors tracking, for example, location (e.g., GPS data), humidity, temperature, carbon dioxide, etc.

All of the collected data is transmitted to the computing device 16, which alone or in conjunction with the anonymity/obfuscation engine 30 and/or the filter 32 is configured to process the data and generate output. The computing device 16 is configured to generate analytics (e.g., raw data and logical data representations of the raw data) after performing one or more analyses on the data received from the query, in one embodiment, the analysis performed will depend, at least in part, upon the query, triggering event, or external condition that initiated the data search, and/or the format of the data received. As one example, well-formatted data (e.g., from a web feed or site syndication) that is suitable for insertion into the database 20 as received may not undergo much, if any, analysis, whereas non-formatted data may be re-mapped in order to generate suitable analytics for the database 20. In another embodiment, the analysis performed will depend, at least in part, upon the context of the node that is in place when the query is run.

It is to be understood that different nodes of the workflow will have associated therewith different active analytics scripts (that are in place in and operable via the computing device 16) to interpret received information, often irrespective of the query used to obtain this information. As one example, when a query is initiated during the creation node of a document workflow, the analytic scripts run by the computing device 16 may be different than analytics scripts that are run when a query is initiated during the editing node of the same document workflow. More particularly, analytics scripts run when the node is "creation" may relate to, for example, checking for duplicate documents started by the same user for the same task/workflow, validating that the user has the right to begin the workflow, etc., and analytics scripts run when the node is "editing" may relate to, for example, checking for the number of tasks remaining for completion, validating input, validating decryption, logging changes, etc.

In still another embodiment, the analysis performed will depend, at least in part, upon the access level of the user requesting the query, if any. For example, since a superuser may be allowed to edit all parts of a document, the analysis based upon a request form a superuser may involve the entire document; however, another user may only be allowed to read (i.e., not edit) or may not have some sections not visible on his/her screen, and thus the analysis may involve the generation of generic statistics (e.g., since the user cannot change data in the workflow) or may involve only those portions visible to the requesting user.

The analysis performed may also depend upon the reputation, reliability, ranking, etc. of the data producer/source (e.g., subscriber or non-subscriber), especially in instances where there is conflicting data. If there is no difference in reputation, ranking or reliability of the data producers/sources, than the most recent data is used first, or a moving average of all data is used, or the like.

The analysis may not only take into account the data received as a result of the query, but may also combine the new data with one or more previous data sets to generate composite or emergent data based upon the combined data sets. As such, new analytics may be generated based upon the combination of the newly received data and older data already in the database 20.

It is to be understood that the computing device 16 may be reconfigured and/or reprogrammed in order to update analytics scripts and/or other analysis programs such that the system 18 is able to produce up-to-date and desirable output. For example, one can edit scripts to change or input the keywords used to identify usable and/or important and non-usable and/or nor-important data.

The anonymity/obfuscation engine 30 is in operative communication with the computing device 16, and is configured to anonymize the analytics generated by the computing device 16. The anonymity/obfuscation engine 30 receives the generated analytics when the access level of the user does not enable him/her to see certain information contained in the analytics. For example, if an engineer logs into the system 18 and notices that a purchasing budget associated with his project is incorrect, his request entry may ask who approved the purchasing budget. If the engineer's access level requires that he is not privy to this information, the anonymity/obfuscation engine 30 may ensure that the generated analytics include a generic message (e.g., "a manager approved the purchasing budget" or "you do not have access to such information").

The filter 32 is also in operative communication with the computing device 16 (and the anonymity/obfuscation engine 30), and is configured to aggregate, categorize, and/or classify the analytics and/or output generated by the computing device 16. The filter 32 may also scan for specific analytics triggering or indexing terms, such as "signature", "approved", "rejected", "re-apply", "cancelled", etc. in order to re-structure the output of the analysis into presentable form for the user, taking into any access rights associated with the particular user.

In embodiments in which the data collection event/search is triggered by a user request, it is to be understood that the generated output may be transmitted to the user via an email, a text message, a short service messaging (SMS) message, an instant message, or combinations thereof. This type of message may be sent to the user on his/her computing device 14 (or another electronic device associated with the user). In another embodiment, the computing device 16 may instruct the user to pull up (on the screen of his/her computing device 14) a provenance record of the document(s) and/or product(s) and view a particular workflow or field to view the requested information.

The output is also used to update one or more fields in the database 20. This will be described in reference to FIG. 2. After the engine 26 actively collects data from networks associated with one or more of the subscribers S1, S2, S3, S4 and one or more of the non-subscribers NS1, NS2 in response to a request or triggering event/condition (see reference numerals 200 and 202), the computing device 16 processes the received data, and then inputs the generated output into appropriate fields in the database 20.

As shown in reference numeral 204, the computing device 16 scans the database 20 to determine if the generated analytics (i.e., raw data or data derived from the raw data) is present in the registry database 20. In some instances, the generated output (e.g., analytics) is not present in the registry database 20, and thus de novo fields are generated and populated with this information (see reference numeral 206). In other instances, the output requires removal of information in current fields, or removal of the fields themselves, and thus these fields may be depopulated (see reference numerals 208 and 216) or even deleted (see reference numeral 208 and 212). In still other instances, the output renders information that is then-currently populated in one or more fields obsolete and/or incorrect, and thus the output may be used to repopulate these pre-existing fields (see reference numeral 210). As such, the set of database fields can grow, shrink, or remain the same after the query is run and analytics are provided.

As illustrated at reference numeral 218, after the database 20 is updated, it is to be understood that the revised, updated or new data in the database 20 is used to dynamically alter the presentation of data for one or more user interfaces UI. These user interfaces UI are visible on the screen of a respective user's particular computing device 14 and allow the user to interact with the system 18. The data added to and/or deleted from the database 20 may alter one or more workflows upstream, downstream, or at the node at which the data collection and analysis takes place. In particular, the computing device 16 is programmed to analyze the received data (alone or in combination with previously stored data sets), and then configure or reconfigure the presentation of data on one or more particular user interfaces UI. The configuration or re-configuration may take into account the user's access rights, the information initially requested (if the search is initiated from a request entry), the information received and/or generated, any other user preference settings (e.g., previously purchased services, selected format settings, etc.), and/or the like. The set of data presented to a particular user may also be altered based upon the source of the data. For example, if there is no difference in reputation, ranking or reliability of the data provider, than the most recent data is used first, or a moving average of all data is used, or the like. As such, the presentation of the data may be altered if, for example, the most trusted, reliable, highest then-currently ranked, etc. data provider changes the format/schema of the data it is presenting. The computing device 16 is also programmed to automate a process, a response, or an action for one or more users of the system 18, and to display these process(es), response(s), or action(s) via the user's interface UI. The organization of the graphical user interface UI is thus tuned to a user's particular workflow. As a result, the most salient information is visually provided to the user and to his/her workflow.

The presentation of data is often based upon the user's role in the workflow. As such, a role-relevant user interface UI is presented, in which the tasks required for a given user to complete or the data presumably of greatest interest to the user are made more visible (e.g., more attention is drawn to the information/data). As one non-limiting example of role-relevant dynamically reconfigurable data presentation involves a shipping form in which case the shipping ID, routing information, etc. is made most obvious to the shipping personnel via their respective user interfaces UI, and the information related to the materials is made most obvious to the shipper and sender via their respective user interfaces UI. As another non-limiting example of a role-relevant scenario, an authorized user requests information from the system 18 regarding the purchasing budget for his/her project. The data received (as a result of the search) by the computing device 16 indicates that the budget has not yet been approved by Mr. X. When the user's access rights allow him/her access to this information, the computing device 16 may reconfigure the authorized user's interface with an alert that Mr. X has not yet approved the budget. The computing device 16 may also be configured to identify the unfilled field in the database 20 and revise the user interface UI associated with Mr. X such that the purchasing budget field of the workflow remains highlighted until it is filled in with suitable data. This particular user interface configuration will alert Mr. X to the fact that the purchasing budget portion of the workflow is awaiting completion. Alternatively or additionally, the computing device 16 may generate a de novo action item field in the workflow and insert a message (which recites, for example, "compete purchasing budget") in this field to be displayed via Mr. X's user interface UI. As illustrated in these non-limiting examples, the presentation of data for one user may be different from the presentation of data for another user, and the data presented may also be different. In still another non-limiting example, the presentation of data may also involve a simple rearrangement for a particular user. For example, the task "forensic" in a workflow may be positioned at the top of the list when a forensic agent logs in, while the task "tracking" in the same workflow may be positioned at the top of the list when a tracking agent logs in.

It is to be understood that alerts may also be generated manually at any point in the service (e.g., by Mr. X's supervisor in the example provided above) as long as the user has access/permission to generate these alerts. When alerts are manually generated, it is to be understood that only those subscribers S1, S2, S3, S4 that subscribe to the particular feed are notified of the manually input alert.

When configuring or reconfiguring the user interface(s) UI, it is to be understood that the computing device 16 and the cloud computing network 12 are configured to post additional information to a user's profile and/or one or more workflows based upon the levels of discretization of access control—e.g., security levels of user(s) associated with the profile and/or workflows. For example, the computing device 16 may add information regarding payment methods, new services (e.g., track and trace services, forensics services, etc.), or the like to a user's profile that has access to make payments, can add new services to the service plan, etc. Furthermore, the computing device 16 and the cloud computing network 12 may also publicly post information on the website hosting the access point 34. This information may be based upon general security levels, such that any person accessing the website is not given information that he/she is not entitled to receive. This information may be general information about the document workflow management system 18, services and corresponding prices, etc.

Referring now to FIG. 3, a document workflow 300 involving three subscribers S1, S2, and S3 is depicted. More specifically, the input, revising, or deletion of data at various nodes A, B, C, of the document workflow 300 is depicted along with a few examples of the various user interface UI data configurations 310, 312, 314 that may result in such a workflow 300.

As illustrated in FIG. 3, as document(s) (not shown) is/are worked on and processed through the workflow 300, different information (examples of which are shown in { } in the figure) is logged in or out of the database 20 for different nodes A, B, C. The data changes that are made in the system 18 may be the result of a data collection event that is initiated as a result of a query or some other triggering event or condition. For example, at node A, a document(s) is(are) generated, and information {r, s, t} pertaining to the document(s)' generation is added to the database 20. When a query is initiated at node B, the resulting analytics (i.e., raw data or data derived from the raw data as a result of the search), e.g., {s, v, y}, are generated. The computing device 16 will recognize that information {u, v, y} is new because this information is not present after the work in accordance with node A is complete, and thus will create de novo fields to add this data to the database 20. For example, if the new information "y" is relevant statistical information about the document(s) taken from a non-subscriber website, the database 20 will generate a new field (e.g., "statistics") for this information. In this workflow 300, the processes completed for node C result in previously stored information {s} becoming obsolete (denoted by the {−s}) and new information being added to the database 20. As such, information {s} is removed from the database 20, and new information {w, x} is added to the appropriate pre-existing fields in the database 20.

It is to be understood that the graphical feedback that is available/visible via a user interface UI in this workflow 300 will depend upon when the information (e.g., record, provenance record, etc.) is accessed (e.g., if the document(s) has/have not yet been processed at node C, the information will be different than if the document(s) has/have been processed at node C); the access rights of the particular user; and the node(s) associated with the requested information. For example, a user at subscriber S2 may request to review the entire provenance record of the document(s) prior to shipping the document(s) to node C to ensure that the workflow is as complete as it can be at that point. In response to this request, the computing device 16 will per form a dynamic (re-)configuration of the user's interface (e.g., reference numeral 310) to present any information (in accordance with the user's access level) that has been logged in to the database 20 at or in accordance with processes associated with nodes/states A and B.

A user may also request to review a record at a particular node/state in order to determine, for example, who signed for the document(s), whether track and trace is in order, and/or whether compliance has been met thus far. In the example shown in FIG. 3, the user at subscriber S2 requests to see the workflow at node B alone. In response to this request, the computing device 16 will perform a dynamic (re-)configuration of the user's interface (e.g., reference numeral 312) to present any information (in accordance with the user's access level) that has been logged in to the database 20 at or in accordance with processes associated with node/state B. Any new information introduced at node B may be bolded, highlighted, italicized or otherwise emphasized so that the user is aware that this information is new. Any pre-existing information that had not been updated at node B, but rather is present from processing/action/etc. at another node (in this example, node A), may be presented in a default or other format so that it is distinguishable from the new information. It is to be understood that the order, highlighting, display aesthetics, etc. of the data presented may also be changed for each user. Furthermore, if the user requests to see only new information input at node B, it is to be understood that the presentation of the data will be revised to show the new data {u v, y} alone. As such, in this particular embodiment, the data from node A (i.e., {s}) will not be illustrated via the user interface.

In the other example shown in FIG. 3, a user may also request to review the overall graphical provenance record. In response to this request, the computing device 16 will perform a dynamic (re-)configuration of the user's interface (e.g., reference numeral 314) to present any information (in accordance with the user's access level) that has been logged in to the database 20 at or in accordance with processes associated with each of node/state A, B, and C. It is to be understood that the data may be presented using different colors, fonts, or other distinguishable format options that are assigned by the user and/or the computing device 16 so that the user can readily distinguish (e.g., on the screen) between information associated with the respective nodes. For example, the data's relative size, order, location, position on a main menu or a click-through, etc. may be reconfigured from user to user. Furthermore, as illustrated in FIG. 3, the computing device 16 may be programmed to identify at which node data is removed from the database 20. Alternatively, computing device 16 can be configured to present the data in a timeline format that illustrates what happened at node A, what happened at node B, and what happened at node C. This format would allow a user to deduce that somewhere between nodes B and C, the compliance rules changed or were not followed.

While not shown in FIG. 3, an overall provenance record may also include a timeline of request entries received and query searches performed. This may assist a user in understanding why certain information (e.g., statistics) is present in the provenance record. This may also assist an operator of the system 18 in revising analytics scripts and/or software routines, in generating new services, etc.

While various scenarios are described in reference to FIG. 3, it is to be understood that these embodiments are not to be limiting, and that other data presentations are contemplated, for example, when the role of the user, the node/stage, and/or the reputation of the data has/have charged.

FIGS. 4 and 5A through 5D will now be discussed together. A specific example of the method is depicted in FIG. 4. FIGS. 5A through 5D schematically depict data presentations on different user interfaces throughout the method of FIG. 4. As such, together FIGS. 4 and 5A through 5D illustrate how the presentation of data in a workflow dynamically changes i) based on data which is new, combined, or indicated by a plaintext search and ii) depending on the user associated with the user interface UI. The non-limiting example illustrated via FIGS. 4 and 5A through 5D involves three subscribers S1, S2, S3, namely, a manufacturer, a distributor, and a retailer.

Referring now to reference numeral 400, the computing device 16 has programmed therein a preset schedule for performing data collection events. Such a preset schedule may vary from workflow to workflow, and may be set by an administrator of the system 18 (e.g., a superuser, a workflow owner, etc.). In this example, the workflow involves the shipment of a product from the manufacturer, to the distributor, and then to the retailer. A schedule for performing data collection events in this particular example may include, e.g., once a day for as long as the workflow is open in the system 18 and/or whenever the product is logged in as being received or shipped (i.e., inventory monitoring/auditing). In the example shown at reference numeral 400, the triggering event is the distributor inputting information into the database 20 that indicates that the product has been shipped to the retailer.

Once the triggering event is recognized, the mapping engine 26 generates a query for searching subscriber S1, S2, S3, S4 and non-subscriber sources NS1, NS2, as shown at reference numeral 402. The query generated in response to this type of trigger may be more generic than a query that is generated in response to a specific request. For example, since the shipping of the product from the distributor triggered the data search, the generated query may relate generally to the distributor and/or to the route that the product will travel. In this embodiment, the results of the query may be used to make a prediction a priori, and updated predictions may be generated during analysis based on new facts or notifications received as a result of the search. The query may also be more specific, if, for example, the engine 26 knows the shipping company used to transfer the product.

The engine 26 then actively collects data/information from subscriber and/or non-subscriber sources via one or more of the methods previously described. In this example, and as shown at reference numeral 404, the engine 26 retrieves data from a non-subscriber social networking site that has a post that states that rats have been reported in one of distributor's warehouses. This information may have initially been posted to the social networking website from, for example, an employee of a trucking company that picks up shipments from the warehouse in which the rats were seen, or any other individual who happened to see the rat(s) at the warehouse. In this particular example, the rat information alone is retrieved as a result of the query. While not discussed further in the Example of FIG. 4, it is to be understood that depending on the severity of the response to this information and/or any legal implications, further verification may be sought or even requested directly from the distributor prior to updating different user's interfaces UI. For example, an email or an SMS may be sent to an appropriate user at the supposedly infested site so that he/she can defend/deny the allegations before alerts and/or actions are generated.

The information is sent to the computing device 16 which cross-checks the rat information with the database 20 to determine i) if the information is already present in the database 20, ii) if the information alone can be used to generate additional information, and ii) if the information can be combined with previously stored information to generate a new data set. As previously mentioned, other actions may be taken in order to verify the received information before accepting potentially incorrect/unvalidated information into the database 20. The analytics scripts and software routines run on the new information may also depend upon the fact that the query was initiated after the product left the distributor (e.g., analytics scripts may be configured to generate alerts when potential problems are found in the data collected or to make attempts at verifying the information based upon its severity or potential legal ramifications for reporting false data). Based upon the results of this analysis, the computing device 16 updates the database 20, and also dynamically alters any user interface UI that may be affected upstream (e.g., retailer), or downstream (e.g., manufacturer), or at the point (e.g., distributor) where the rat information is received in the workflow.

One example of the dynamic configuration or re-configuration of the manufacturers user interface UIM is shown in FIG. 5A and is discussed in reference numerals 408 and 410 of FIG. 4. In this particular example, the potential presence of rats in one or more of the distributor's warehouses may be of interest to the manufacturer of the product. The computing device 16 is configured to generate an alert for all employees of the manufacturer. Such an alert may be displayed, for example, in the track and trace workflow since the information relates to the route that the product may have taken. As such, if a manufacturer employee reviews the track and trace workflow, he/she will be alerted to the potential problem. A review of the complete provenance record of the product would also apprise the manufacturer employee of the potential problem.

It is to be understood that the reporting of data widely (e.g., to all employees of the manufacturer in the previous example) may depend upon the potential liability involved. For example, the potential presence of rats in a warehouse may not be widely conveyed using the system 18 prior to verification of this information because the potential liability for a false alert is greater than the potential liability for not alerting other users of this information (e.g., because the product being shipped is not edible, is contained in sealed bottles, etc.). In another example however, if data received as a result of a query is more severe (e.g., data verified the presence of a methane leak at a facility), the potential liability for not generating an alert would be greater than for falsely altering due to the possibility of an explosion. While not shown, the computing device 16 includes a rules (or policy-enforcing) engine that is configured to determine the severity of the information and whether this information should be posted. Alternately, a local authorized contact at the entity involved with this data (e.g., a manager at the warehouse or a manager at the facility where the methane leak is taking place) may be contacted (e.g., via an email or SMS sent from the computing device 16) to authorize or deny the conveyance of this information via the system 18.

The computing device 16 may also be configured to create new services for existing subscribers S1, S2, S3 based upon newly received, generated, and/or combined data. As shown at reference numeral 410 and in FIG. 5A, the computing device 16 may offer, for example, a recall service to the manufacturer. The analysis of the newly received data about the rats may have identified twenty five other workflows in the system 18 involving the distributor, where the provenance records of these workflows include fields regarding both rat problems and recalls of products. This analysis combines the new information with old information, and leads the computing device 16 to deduce that a recall may be necessary, and to offer a recall service (operated through the system 18 by notifying all parties who have received the product in the forward trace) to the manufacturer. This offer may appear on the user interface UIM of those users who are associated with the manufacturer and have permission to sign up for new services. As illustrated in FIG. 5A, this offer for new services may be included in the graphical provenance record shown on the updated user interface UIM. If the user at the manufacturer subscribes to this new service, any recall information may be posted on the database 20 and made available to other authorized users at the manufacturer and at other subscribers S2, S3, etc. While a new recall service is described in this example, it is to be understood that any new service may be offered, and the generation of these new services will depend upon the analysis performed.

Another example of the dynamic user interface configuration or re-configuration that may take place in this example is of the distributor's user interface UID, as shown in FIG. 5B and at reference numeral 414 of FIG. 4. The potential presence of rats in one or more of the distributor's warehouses may be of interest to the distributor. The computing device 16 is configured to generate an alert for a certain level of management of the distributor. Again, such an alert may be displayed, for example, in the track and trace workflow since the information relates to the route that the product may have taken. As such, if a manager having access to this information in the track and trace workflow reviews the workflow, he/she will be alerted to the report of the rats and to the potential problem. If both the manager and the owner have access to this information, it is to be understood that the display of the information may be different for the respective users (e.g., the alert may be at the top of the main page for the owner, but may be the first line-item under the track and trace workflow for the manager). A review of the complete provenance record of the product would also apprise the distributor manager of the potential problem. As illustrated in FIG. 5, the alert generated for the distributor's manager(s) may also inform him/her that the manufacturer has been made aware of this information. This type of alert may be generated because the search was initiated at the distribution node, and thus the analytics scripts are configured to not only inform the distributor of the information, but also make the distributor aware of where the information has been sent. One example of the dynamic configuration or re-configuration of the manufacturer's user interface UIM is shown in FIG. 5A and is discussed in reference numerals 408 and 410 of FIG. 4. In this particular example, the potential presence of rats in one or more of the distributor's warehouses may be of interest to the manufacturer of the product. The computing device 16 is configured to generate an alert for all employees of the manufacturer. Such an alert may be displayed, for example, in the track and trace workflow since the information relates to the route that the product may have taken. It is to be understood that the display of this information may also vary from user to user depending upon his/her role in the workflow. As such, if a manufacturer employee reviews the track and trace workflow, he/she will be alerted to the potential problem. A review of the complete provenance record of the product would also apprise the manufacturer employee of the potential problem.

Figure 5D:
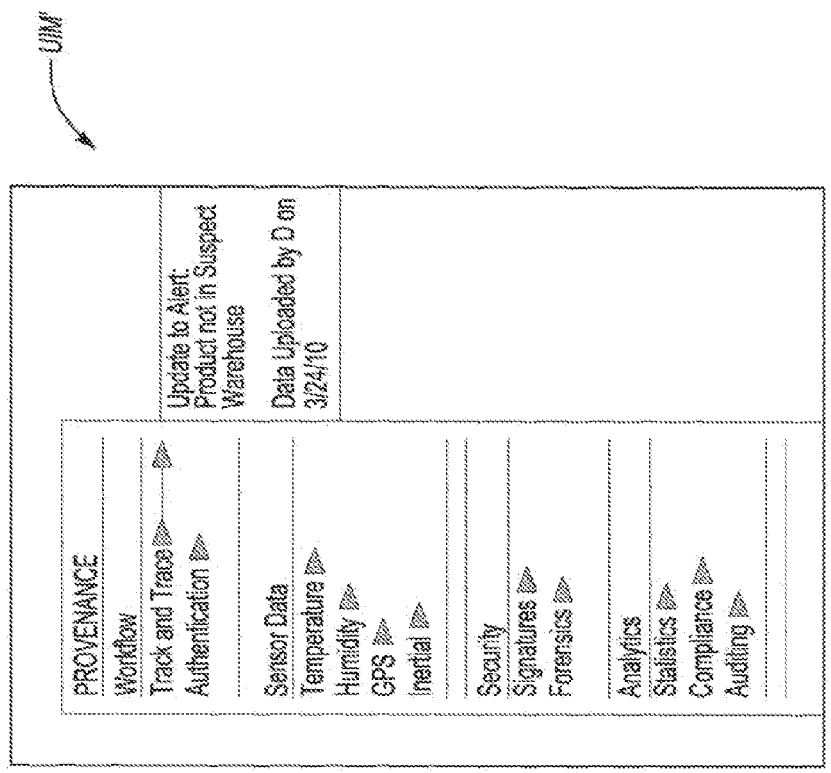
Figure 5C:
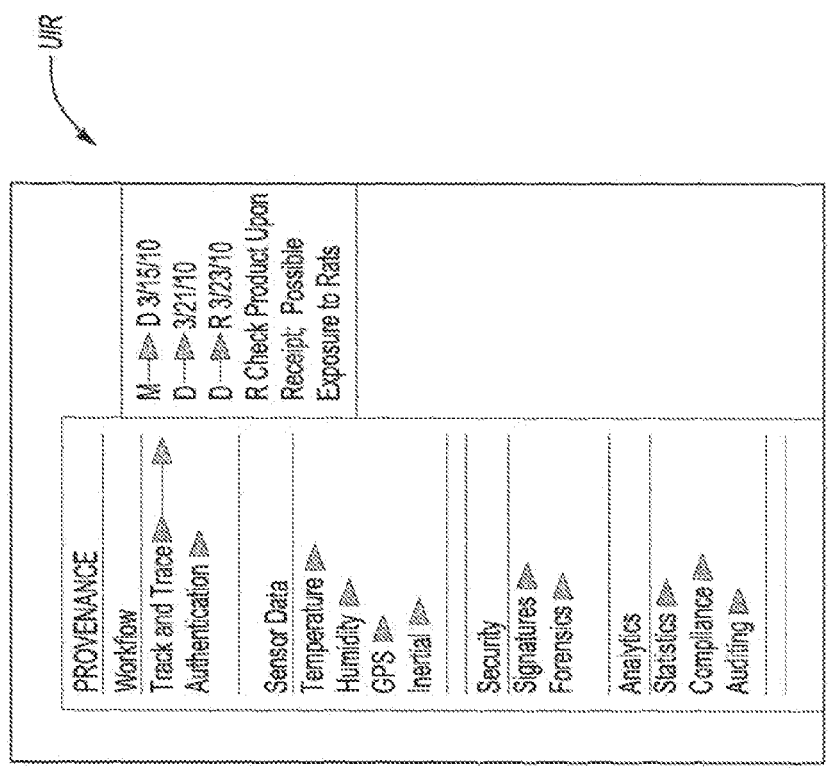

Still another example of the dynamic user interface configuration or re-configuration that may take place in this example is of the retailer's user interface UIR, as shown in FIG. 5C and at reference numeral 412 of FIG. 4. The potential presence of rats in one or more of the distributor's warehouses may be of interest to the retailer. The computing device 16 is configured to generate an alert for all employees of the retailer (since, for example, a stock person may be the first to inspect the shipped products). Again, such an alert may be displayed, for example, in the track and trace workflow since the information relates to the route that the product may have taken, and/or may be displayed in a desirable location based upon the user's role in the workflow. In this example, the track and trace workflow may include the date that the product was shipped form the manufacturer (M) to the distributor (D), the date that the product was received at the distributor, and also the date that the distributor shipped the product to the retailer (R). This information may also have been included in the track and trace workflows viewable by the manufacturer and the distributor (although not shown in FIGS. 5A and 5B). In addition to the track and trace history, the data presentation for the retailer includes a note to check the product upon receipt because of possible exposure to rats. As such, if an employee of the retailer reviews the track and trace workflow or the provenance record for the product, he/she will be made aware of the instruction and the potential problem.

As shown in FIG. 4 at reference numeral 416, after reviewing the track and trace workflow and the alert about the rats, an authorized user at the distributor may update the database 20 with information illustrating, or even proving, that the manufacturer's product was not in the suspect warehouse. For example, the user at the distributor may scan in a document and/or upload surveillance footage showing that the product in question was received at and then shipped from warehouse XYZ, which is located in a different city than the warehouse that is suspected of containing rats. The input of this additional information may trigger the computing device 16 to generate a follow up alert for the manufacturer, for example, stating that updated information indicates that the product was not exposed to rats as evidence by the data uploaded by the distributor on a particular date. These consistent updates inform the manufacturer (and one or more of any other appropriate subscribers) of all of the information to which he/she is privy to in terms of access level, and allows the recipient of this information at the manufacturer to determined a proper course of action, if any. As illustrated by this non-limiting example, the system 18 may scale up information as is necessary and/or appropriate.

The presentation of data may include pop-up menus and sub-menus, main data fields and sub-fields, graphs, charts, and/or any other format that is pre-selected by a user or is automatically selected by the computing device 16. Reformatting for non-alert-level information is often in accordance with user-defined settings.

As illustrated by the examples disclosed herein, the system 18 is capable of changing the presentation of information for a particular user based upon data (retrieved using a plaintext search) that is new and/or a combination of new and old. This is particularly desirable because the results of the search may be tailored for any subscriber (or particular user) participating in a workflow, regardless of their position in the workflow relative to the position at which the data was collected and analyzed. As such, information may be propagated upstream of, downstream of, or at the data collection/analysis point. These dynamic configurations and re-configurations of user interfaces provide a system 10 capable of offering subscribers user specific and aggregated information from a variety of sources (both inside and outside of the supply chain, document workflow, etc.).

While several embodiments have been described in detail, it will be apparent to those skilled in the art that the disclosed embodiments may be modified. Therefore, the foregoing description is to be considered exemplary rather than limiting.

What is claimed is:
1. An information tracking system, comprising:
    a plurality of sources that subscribe to a workflow management system;
    an other source that is unaffiliated with the workflow management system;
    a registry database, including:
        pre-existing fields to store data received from one or more of the plurality of sources or from the other source; and
        de novo fields to be generated as a result of a data collection event and to store data received from one or more of the plurality of sources or from the other source;
    an engine to actively collect data from the plurality of sources and from the other source at a point in a workflow;
    a computing device to:
        receive the data collected by the engine;
        generate output from the data;
        automatically update the registry database by:

generating the de novo fields and populating the de novo fields when the output is not present in the registry database;

depopulating or deleting the pre-existing fields when the output requires removal of information in the pre-existing fields or removal of the pre-existing fields; and repopulating the pre-existing fields when the output renders information that is then-currently populated in the pre-existing fields is obsolete or incorrect;

dynamically change the workflow in response to the output by generating any of a de novo action item, a de novo alert, or a new service for a particular one of the plurality of sources at a different point in the workflow than the point in the workflow at which the data is collected; and dynamically configure or reconfigure a dynamically updatable user interface for the one of the plurality of sources with the any of the de novo action item, the de novo alert, or the new service; and the dynamically updatable user interface operatively connected to the registry database.

2. The information tracking system as defined in claim 1, wherein the computing device is further to alter a presentation of data visible on the dynamically updatable user interface for the particular one of the plurality of sources.

3. The information tracking system as defined in claim 2 wherein the computing device is further to simultaneously alter an other presentation of data visible on an other dynamically updatable user interface for an other one of the plurality of sources in a manner different that the presentation of data for the particular one of the plurality of sources.

4. The information tracking system as defined in claim 1 wherein the workflow is to be accessible by and visible to one or more of the plurality of sources via the dynamically updatable user interface.

5. The information tracking system as defined in claim 1, wherein each of the plurality of sources is part of a supply chain and participates in the workflow, and wherein the computing device is further to automate at least one of a process, a response, or an action for a particular node of the workflow upstream or downstream of the point at which the data is collected.

6. The information tracking system as defined in claim 1, further comprising:

an other computing device to transmit a request entry to the engine, wherein the engine is further to map the request entry into a query, and actively collect the data based upon the query; and a cloud computing network to be accessible by the other computing device and to provide an access point into the workflow management system.

7. The information tracking system as defined in claim 1 wherein the computing device is further to configure or reconfigure presentation of data for the particular one of the plurality of sources taking into account access rights of a user associated with the particular one of the plurality of sources.

8. The information tracking system as defined in claim 1, further comprising an anonymity or obfuscation engine in operative communication with the computing device, the anonymity or obfuscation engine to anonymize or obfuscate the output.

9. The information tracking system as defined in claim 1, further comprising a filter in operative communication with the computing device, the filter to at least one of aggregate, categorize, or classify the output.

10. The information tracking system as defined in claim 1, further comprising a hierarchy of the data in the registry database, the hierarchy being based upon a query semantics tag assigned to at least one of the plurality of sources or a document-based workflow after the data is collected.

11. The information tracking system as defined in claim 1 wherein the other source includes a data network and any of a website affiliated with the data network or pollable or self-reporting sensors, and wherein the engine is to perform a search of the website or retrieve data from the pollable or self-reporting sensors through a web-accessible information storage space associated with the other source.

12. A method operating on a cloud computing network for dynamic updating of an information tracking system, the cloud computing network having instructions stored thereon, the instructions being executable to perform the steps of:

actively collecting, via an engine and at a point in a workflow, data from a plurality of sources that subscribe to a workflow management system and from an other source that is unaffiliated with and does not subscribe to the workflow management system;

via a computing device in operative communication with the engine, automatically generating output from the collected data;

automatically updating, via the computing device, a registry database with the collected data by:

i) repopulating a pre-existing field of the registry database when the output renders information that is then-currently populated in the pre-existing field is obsolete or incorrect;

ii) depopulating or deleting a pre-existing field of the registry database when the output requires removal of information in the pre-existing field or removal of the pre-existing field; and iii) when the output is not present in the registry database, creating at least one de novo field in the registry database; and populating the at least one de novo field based upon the collected data;

via the computing device and in response to the output, dynamically changing the workflow by generating any of a de novo action item, a de novo alert, or a new service for a particular one of the plurality of sources at a different point in the workflow than the point in the workflow at which the data is collected; and via the computing device, performing dynamic configuration or re-configuration of a user interface of the information registry system for a particular one of the plurality of sources in with the any of the de novo action item, the de novo alert, or the new service.

13. The method as defined in claim 12 wherein dynamically configuring or re-configuring includes changing a presentation of data visible on the user interface, wherein the presentation of the data includes adding composite data that is based on one or more previous data sets in combination with a new data set from the collection of data.

14. The method as defined in claim 12, further comprising performing dynamic configuration or re-configuration of the user interface of the information registry system for an other one of the plurality of sources in response to the collection of data, wherein a presentation of data for the other one of the plurality of sources is different than the presentation of data for the particular one of the plurality of sources.

15. The method as defined in claim 12, further comprising:

recognizing, via the computing device, that collected data can be offered as a new service for at least one of the plurality of sources; and transmitting an offer, from the computing device to the at least one of the plurality of sources, to subscribe to the new service.

16. The method as defined in claim 12 wherein at least some of the plurality of sources are part of a supply chain that participates in the workflow, and wherein the method further comprises automating, via the computing device, at least one of a process, a response, or an action for at least one of the plurality of sources upstream or downstream of the point at which the data is collected.

17. The method as defined in claim 12, further comprising:
    recognizing, at the computing device, at least one of a request entry, a triggering event, or a triggering condition; and
    in response to the recognizing, initiating the collection of data based upon information associated with the at least one of the request entry, the triggering event, or the triggering condition.

18. An information tracking system, comprising:
    a plurality of sources that subscribe to a workflow management system;
    an other source that is unaffiliated with the workflow management system;
    a registry database, including:
        pre-existing fields to store data received from one or more of the plurality of sources or from the other source; and
        de novo fields to be generated as a result of a data collection event and to store data received from one or more of the plurality of sources or from the other source;
    an engine to actively collect data from the plurality of sources and from the other source at a point in a workflow; and
    a computing device to:
        generate output from the data collected by the engine;
        dynamically change the workflow in response to the output by generating any of a de novo action item, a de novo alert, or a new service for a particular one of the plurality of sources at a different point in the workflow than the point in the workflow at which the data is collected; and
        dynamically configure or reconfigure a dynamically updatable user interface for the one of the plurality of sources with the any of the de novo action item, the de novo alert, or the new service.

19. The information tracking system as defined in claim 18, wherein each of the plurality of sources is part of a supply chain and participates in the workflow, and wherein the computing device is further to automate at least one of a process, a response, or an action for a particular node of the workflow upstream or downstream of the point at which the data is collected.

* * * * *